United States Patent
Hall et al.

(10) Patent No.: US 9,168,487 B2
(45) Date of Patent: Oct. 27, 2015

(54) ALKANOLAMINE-BASED CARBON DIOXIDE ABSORPTION SOLUTIONS WITH REDUCED CORROSIVITY

(75) Inventors: Larry Kent Hall, Easton, PA (US); Joseph Kimler, Yardville, NJ (US); Thomas Bedard, Ringwood, NJ (US)

(73) Assignee: LONZA LTD., Basel (CH)

( * ) Notice: Subject to any disclaimer, the term of this patent is extended or adjusted under 35 U.S.C. 154(b) by 1207 days.

(21) Appl. No.: 13/125,641

(22) PCT Filed: Oct. 26, 2009

(86) PCT No.: PCT/EP2009/007642
§ 371 (c)(1), (2), (4) Date: Jun. 23, 2011

(87) PCT Pub. No.: WO2010/046134
PCT Pub. Date: Apr. 29, 2010

(65) Prior Publication Data
US 2011/0262330 A1    Oct. 27, 2011

Related U.S. Application Data

(60) Provisional application No. 61/108,136, filed on Oct. 24, 2008.

(30) Foreign Application Priority Data

Dec. 22, 2008    (EP) ................................. 08022254

(51) Int. Cl.
B01D 53/62    (2006.01)
B01D 53/78    (2006.01)
B01D 53/14    (2006.01)
(Continued)

(52) U.S. Cl.
CPC ........ *B01D 53/1493* (2013.01); *B01D 53/1475* (2013.01); *B01D 53/62* (2013.01); *B01D 53/78* (2013.01); *C23F 11/141* (2013.01); *B01D 53/77* (2013.01); *B01D 2251/206* (2013.01);
(Continued)

(58) Field of Classification Search
None
See application file for complete search history.

(56) References Cited

U.S. PATENT DOCUMENTS 5,225,103 A    7/1993 Hoffmann et al.
5,339,633 A *  8/1994 Fujii et al. ..................... 423/229
(Continued)

FOREIGN PATENT DOCUMENTS

DE    102008013738 A1    9/2009
EP    0224348    6/1987
(Continued)

OTHER PUBLICATIONS

"Quaternary ammonium salt." Dictionary.com (2014). Viewed Apr. 17, 2014 at http://dictionary.reference.com/browse/quaternary+ammonium+salt.*
(Continued)

*Primary Examiner* — Stanley Silverman
*Assistant Examiner* — Daniel Berns
(74) *Attorney, Agent, or Firm* — Hoffmann & Baron, LLP

(57) ABSTRACT

An aqueous carbon dioxide-absorbent solution comprising at least one alkanolamine and at least one quaternary ammonium salt is disclosed. A method of recovering carbon dioxide from a carbon dioxide-containing gaseous mixture and a method of reducing metal corrosion in an alkanolamine-based exhaust gas treating process are also disclosed.

16 Claims, 2 Drawing Sheets

(51) Int. Cl.
  *C23F 11/14* (2006.01)
  *B01D 53/77* (2006.01)

(52) U.S. Cl.
  CPC .......... *B01D2257/504* (2013.01); *Y02C 10/04* (2013.01); *Y02C 10/06* (2013.01)

(56) References Cited

U.S. PATENT DOCUMENTS 5,744,024 A    4/1998  Sullivan, III et al.
7,057,070 B1 * 6/2006  Tseng et al. .................. 564/282

FOREIGN PATENT DOCUMENTS

EP    0684067    11/1995
GB    1597038    9/1981

OTHER PUBLICATIONS

Robert J. Hook, An Investigation of Some Sterically Hindered Amines as Potential Carbon Dioxide Scrubbing Compounds, Chem. Res. 1997, 36 (5) 1779-1790.

* cited by examiner

ALKANOLAMINE-BASED CARBON DIOXIDE ABSORPTION SOLUTIONS WITH REDUCED CORROSIVITY

This application is the U.S. National Phase of, and Applicants claim priority from, International Patent Application Number PCT/EP2009/007642 filed 26 Oct. 2009, European Patent Application bearing Ser. No. 08/022,254.0 filed 22 Dec. 2008 and U.S. Provisional Patent Application No. 61/108,136 filed 24 Oct. 2008, which are incorporated herein by reference in their entirety.

BACKGROUND OF THE INVENTION

The present invention relates to fossil fuel combustion, and, in particular, to removal of carbon dioxide from fossil fuel combustion gas mixtures.

Carbon sequestration refers to the capture and storage of carbon that would otherwise be emitted to, or remain, in the atmosphere as carbon dioxide ($CO_2$). Fossil fuels are the main source of world fuel and supply over 85% of all primary energy, with nuclear, hydroelectric, solar, wind, and geothermal making up the rest. Although significant efforts and capital investments have been made by many nations to increase renewable energy options and to foster conservation and efficiency improvements of fossil fuel utilization, climate change during the coming decades will likely require significant effort and resources be expended on carbon sequestration.

The potential impact of increasing concentrations of greenhouse gases in the atmosphere will be a global concern well into the 21$^{st}$ century and perhaps even beyond. There are three primary initiatives that the U.S. Department of Energy has undertaken to address the buildup of greenhouse gases. These include the improved efficiency of energy utilization, the adoption of low carbon fuels, and carbon sequestration. Carbon geosequestration is the process of not only capturing $CO_2$ emissions that would otherwise be lost into the atmosphere, but permanently storing them in geologic formations such as oil and gas reservoirs, abandoned coal seams, and deep ocean waters.

The primary sources of $CO_2$ are fossil-fueled power plants, industrial processes, and in the future, by-products of fuel decarbonization plants. Power plants are the largest source and emit more than one-third of all $CO_2$ emissions worldwide. There are three primary routes for capturing power plant $CO_2$ effluent: flue gas separation, oxy-fuel combustion, and pre-combustion separation. While all three approaches have been piloted, flue gas separation is currently the most common commercial method.

Flue gas separation and $CO_2$ capture are based on chemical absorption whereby $CO_2$ is reacted with an amine and captured as an adduct in the liquid phase. The most commonly used absorbent for $CO_2$ is monoethanolamine (MEA), which carries with it significant problems such as decomposition products requiring hazardous waste disposal and high corrosivity to processing equipment.

Attempts have been made to address the problems associated with MEA treatments. For example, U.S. Pat. No. 4,971,718 discloses the addition of antimony and N-methyldiethanolamine (MDEA) to an aqueous solution of MEA. The combination of antimony and MDEA was supposed to inhibit corrosion and retard solvent degradation. However, antimony compounds present potentially serious toxicity issues, and their use in large industrial applications could be problematic.

U.S. Pat. No. 4,477,419 discloses the use of copper salts in an alkanolamine solution in conjunction with the use of an activated carbon or ion exchange resin. The copper salts combined with the use of an activated carbon or ion exchange resin are supposed to lower corrosivity and/or degradative quality of the solvent. However, the use of carbon beds or iron exchange resins adds further cost and complexity to the $CO_2$ capture process.

In U.S. Pat. No. 4,596,849, a thiourea-amine-formaldehyde based polymer is identified as a corrosion inhibitor for $CO_2$ scrubbing using aqueous MEA. However, the process of U.S. Pat. No. 4,596,849 may produce carcinogens. In particular, the thiourea-amine-formaldehyde based polymer upon deterioration can release some level of formaldehyde, a suspected human carcinogen.

While research has been conducted using amines and amine derivatives as absorption aids, there remains an opportunity for an innovative technology that displays improvement in reduction of corrosion in MEA solutions, an increase in stability of the solvent, and/or less corrosion to the metal processing equipment found in towers and tanks.

It is, therefore, an object of the present invention to provide aqueous alkanolamine-based carbon dioxide absorbent solutions which exhibit low corrosivity to metallic equipment and do not contain or produce compounds which are toxic or harmful to the environment.

DESCRIPTION OF THE INVENTION

It has been found that certain quaternary ammonium salts are compatible with an aqueous alkanolamine solution and that the resultant combination can be used in sequestering carbon dioxide. Furthermore, it has been found that certain quaternary ammonium salts are not only fully compatible with alkanolamines but provide significant reduction in the corrosion rate of metal as measured by mm per year (mm·year$^{-1}$).

The present invention relates to an aqueous $CO_2$ absorbent composition comprising at least one alkanolamine having a minimum of 2 carbon atoms and a maximum of 6 carbon atoms, 1 or 2 hydroxyl groups, and a primary, secondary, or tertiary amino group, in an amount from 10% by weight to 90% by weight, and, in an amount of from 0.03% by weight to 0.20% by weight, based on the total solution, at least one quaternary ammonium salt of the formula

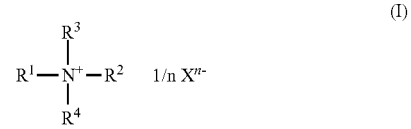

(I)

wherein $R^1$ and $R^2$ are independently optionally aryl-substituted $C_{1-20}$ alkyl groups, $R^3$ and $R^4$ are independently $C_{1-4}$ alkyl groups, $X^{n-}$ is an anion selected from the group consisting of hydroxide, carbonate, bicarbonate, phosphates, phosphites, hypophosphite, nitrate, sulfates, borates, anions of saturated and unsaturated acyclic $C_{1-20}$ monocarboxylic acids, anions of saturated and unsaturated $C_{2-20}$ dicarboxylic acids, and anions of hydroxy-substituted carboxylic acids, and n denotes the appropriate number of negative charges of said anion.

Advantageously, the composition is essentially halogen free, and in particular no halide anion is present in the at least one quaternary ammonium salt.

The invention also relates to a method of recovering $CO_2$ from a $CO_2$-containing gaseous mixture which includes contacting the gaseous mixture with an aqueous absorbent solution including at least one alkanolamine having a minimum of 2 carbon atoms and a maximum of 6 carbon atoms, 1 or 2 hydroxyl groups, and a primary, secondary, or tertiary amino group, in an amount from 10% by weight to 90% by weight, based on the total solution, and at least one quaternary ammonium salt of the formula (I) above, wherein the at least one quaternary ammonium salt is present in an amount of from 0.03% by weight to 0.20% by weight, based on the total solution, when the method of recovering $CO_2$ from a $CO_2$-containing gaseous mixture takes place at a temperature greater than 60° C., but less than 95° C.

In another embodiment, the method of recovering $CO_2$ from a $CO_2$-containing gaseous mixture takes place at a maximum temperature of 60° C. and the at least one ammonium salt of the formula (I) is present in an amount of from 0.01% by weight to 1.0% by weight.

Another embodiment of the invention relates to a method of reducing metallic corrosion in an alkanolamine-based exhaust gas treating process including adding at least one quaternary ammonium salt of the formula (I) above to an aqueous alkanolamine solution, wherein the at least one quaternary ammonium salt of formula (I) is present in an amount of from 0.03% by weight to 0.20% by weight and the gas-treating process is operated at a temperature greater than 60° C., but less than 95° C.

In another embodiment, of the method of reducing corrosion in an alkanolamine exhaust gas treating process, said process is operated at a temperature that does not exceed 60° C., and the quaternary ammonium salt is present in an amount of from 0.01% by weight to 1.0% by weight.

The at least one alkanolamine has a minimum of 2 carbon atoms and a maximum of 6 carbon atoms, 1 or 2 hydroxyl groups, and a primary, secondary, or tertiary amino group.

In a preferred embodiment, the at least one alkanolamine is selected from the group consisting of monoethanolamine (MEA), diethanolamine, N-methyldiethanolamine, 2-amino-2-methyl-1-propanol, 2-(ethylamino)-ethanol, 2-(methylamino)-ethanol, and mixtures thereof. The most preferred alkanolamine is monoethanolamine.

The at least one alkanolamine is present in a minimum amount of 10% by weight, preferably 20% by weight, and more preferably 30% by weight.

The at least one alkanolamine is present in a maximum amount of 90% by weight, preferably 80% by weight, and more preferably 70% by weight.

In a preferred embodiment of the invention, the at least one quaternary ammonium salt of the formula (I) is selected from the group consisting of didecyldimethylammonium bicarbonate/carbonate, didecyldimethylammonium phosphate, didecyldimethylammonium glycolate, didecyldimethylammonium hydroxide, or combinations thereof. The most preferred salt is didecyldimethylammonium bicarbonate/carbonate. The expression "bicarbonate/carbonate" is understood to mean bicarbonate, carbonate, or a mixture of bicarbonate and carbonate.

When the temperature involved in the methods described above does not exceed 60° C., the at least one quaternary ammonium salt of the formula (I) is present in a minimum amount of 0.01% by weight, preferably 0.05% by weight, more preferably 0.10% by weight, and most preferably 0.25% by weight. When the temperature involved in the methods described above does not exceed 60° C., the at least one quaternary ammonium salt of the formula (I) is present in a maximum amount of 1.0% by weight, preferably 0.75% by weight, more preferably 0.6% by weight, and most preferably 0.5% by weight.

When the temperatures involved in the methods described above are greater than 60° C., but less than 95° C., the at least one quaternary ammonium salt of the formula (I) is preferably present in a minimum amount of 0.03% by weight, more preferably 0.05% by weight, and most preferably 0.10% by weight. When the temperatures involved in the methods described above are greater than 60° C., but less than 95° C., the at least one quaternary ammonium salt of the formula (I) is preferably present in a maximum amount of 0.20% by weight, more preferably 0.18% by weight, and most preferably 0.15% by weight.

It has been found that a formulation of at least one alkanolamine and at least one quaternary ammonium salt of the formula (I) can be used in the process of sequestering carbon dioxide. The addition of at least one quaternary ammonium salt of the formula (I) to an alkanolamine solution reduces the corrosion of the alkanolamine solution, increases the stability of the solvent, and leads to less corrosion to metallic processing equipment.

For a better understanding of the present invention, together with other and further advantages, reference is made to the following detailed description, and its scope will be pointed out in the claims.

The present invention relates to a system which includes a composition and method for absorbing carbon dioxide from exhaust gas (flue gas) from fossil fuel combustion. The composition includes an aqueous solution of an alkanolamine and at least one quaternary ammonium salt of formula

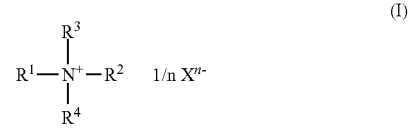

In the formula (I), $R^1R^2R^3R^4N^+$ represents the quaternary ammonium cation. $R^1$ and $R^2$ are independently optionally aryl-substituted $C_{1-20}$ alkyl groups. Accordingly, $R^1$ and $R^2$ are independently unsubstituted $C_{1-20}$ alkyl groups or $C_{1-20}$ alkyl groups substituted with an aryl group.

$C_{1-20}$ alkyl groups are linear or branched alkyl groups having 1 to 20 carbon atoms, including, but not limited to, methyl, ethyl, propyl, isopropyl, butyl, isobutyl, sec-butyl, tert-butyl, pentyl, isopentyl, hexyl, heptyl, octyl, nonyl, isononyl, decyl, dodecyl, tetradecyl, hexadecyl, octadecyl and icosyl. Aryl-substituted $C_{1-20}$ alkyl groups are any of the above groups bearing an aryl group, in particular phenyl, as a substituent. Preferred examples of aryl-substituted $C_{1-20}$ alkyl groups are benzyl, phenylethyl and phenylpropyl.

In one preferred embodiment, $R^1$ is methyl. In another preferred embodiment, $R^2$ is benzyl or phenylethyl.

In another preferred embodiment, $R^1$ and $R^2$ are the same $C_{1-20}$ alkyl groups. More preferably, $R^1$ and $R^2$ are decyl groups. In an even more preferred embodiment, $R^1$ and $R^2$ are n-decyl groups.

$R^3$ and $R^4$ are independently $C_{1-4}$ alkyl groups. The $C_{1-4}$ alkyl groups are linear or branched and unsubstituted. Examples of $C_{1-4}$ alkyl groups include, but are not limited to, methyl, ethyl, propyl, isopropyl, and butyl.

$R^3$ and $R^4$ are preferably methyl groups.

The quaternary ammonium salt contains an anion to balance the charge of the quaternary ammonium cation. The anion may be singly, doubly, triply or multiply charged. The anion is not a halide. Furthermore, halo anions are not present in the at least one quaternary ammonium salt.

In particular, the expression "$X^{n-}$" represents an anion selected from the group consisting of hydroxide, carbonate, bicarbonate, phosphates, phosphites, hypophosphite, nitrate, sulfates, borates, anions of saturated and unsaturated acyclic $C_{1-20}$ monocarboxylic acids, anions of saturated and unsaturated $C_{2-20}$ dicarboxylic acids, and anions of hydroxy-substituted carboxylic acids. The letter n denotes the valence of the anion, i.e., the appropriate number of negative charges of the anion.

The term "phosphates" is to be understood as including both acid and neutral salts of phosphoric acid, namely, dihydrogenphosphates ($X^{n-}=H_2PO_4^-$), monohydrogenphosphates ($X^{n-}=HPO_4^{2-}$) and phosphates ($X^{n-}=PO_4^{3-}$), as well as salts of oligo- and polyphosphoric acids such as diphosphates (pyrophosphates) and triphosphates.

Phosphites are salts of phosphorous acids containing the anions $H_2PO_3^-$ and/or $HPO_3^{2-}$.

The term "sulfates" includes hydrogensulfates ($X^{n-}=HSO_4^-$) and neutral sulfates ($X^{n-}=SO_4^{2-}$) as well as disulfates ($X^{n-}=S_2O_7^{2-}$) and related salts.

Borates are any salts containing anions derived from boric acid ($H_3BO_3$) and the various poly-boric acids.

Saturated and unsaturated acyclic $C_{1-20}$ monocarboxylic acids are in particular alkanoic acids, such as formic, acetic, propionic, butyric, pentanoic, hecanoic, octanoic, decanoic, dodecanoic, tetradecanoic, hexadecanoic, octadecanoic and icosanoic acids, or alkenoic acids, such as acrylic, methacrylic, oleic and linolic acid.

Saturated and unsaturated acyclic $C_{2-20}$ dicarboxylic acids are in particular alkanedioic acids, such as oxalic, malonic, succinic, glutaric and adipic acid, or alkenedioic acids such as fumaric or maleic acid.

Hydroxy-substituted carboxylic acids are any carboxylic acids bearing at least one hydroxy group in addition to the carboxylate group(s), such as glycolic, malic, citric or salicylic acid.

More preferred quaternary ammonium salts are quaternary ammonium carbonates, quaternary ammonium bicarbonates, quaternary ammonium phosphates and quaternary ammonium glycolates. "Bicarbonate/carbonate" is defined as bicarbonate, carbonate, or mixtures thereof.

The most preferred quaternary ammonium cation is didecyldimethylammonium and the most preferred quaternary ammonium salt is didecyldimethylammonium bicarbonate/carbonate (DDABC).

The at least one quaternary ammonium salt includes combinations or mixtures of two or more quaternary ammonium salts of formula (I). For example, the at least one quaternary ammonium salt may be a mixture of DDABC and didecyldimethylammonium hydroxide.

In the composition, the at least one quaternary ammonium salt is present in a minimum amount of 0.03% by weight, preferably 0.05% by weight, and more preferably 0.10% by weight. The quaternary ammonium salt is present in a maximum amount of 0.20% by weight, preferably 0.18% by weight, and more preferably 0.15% by weight in the composition.

The at least one alkanolamine may be any aklanolamine that can sequester carbon dioxide. Effective alkanolamines are well-known in the art. See Robert J. Hook, "An Investigation of Some Sterically Hindered Amines as Potential Carbon Dioxide Scrubbing Compounds," Ind. Eng. Chem. Res. 1997, 36 (5) 1779-1790 for examples of effective alkanolamines.

Suitably, the at least one alkanolamine has a minimum of 2 carbon atoms and a maximum of 6 carbon atoms, 1 or 2 hydroxyl groups, and a primary, secondary, or tertiary amino group. Examples of alkanolamines include, but are not limited to, monoethanolamine, diethanolamine, N-methyldiethanolamine, 2-amino-2-methyl-1-propanol, 2-(ethylamino)-ethanol, and 2-(methylamino)-ethanol. The most preferred alkanolamine is monoethanolamine (MEA).

One alkanolamine or a combination or mixture of two or more alkanolamines may be present in the composition. For example, the composition may include a mixture of monoethanolamine and N-methyldiethanolamine.

The at least one alkanolamine is present in aqueous solution in a minimum amount of 10% by weight, preferably 20% by weight, and more preferably 30% by weight. The at least one alkanolamine is present in aqueous solution in a maximum amount of 90% by weight, preferably 80% by weight, and more preferably 70% by weight.

In a particularly preferred embodiment, the composition includes 0.03% to 0.15% by weight DDABC in an aqueous solution containing 20% to 30% by weight of monoethanolamine.

In a preferred embodiment, the only active ingredients in the composition are the at least one alkanolamine and the at least one quaternary ammonium salt. For example, it is contemplated that other actives such as peroxides are not included in the composition.

The composition of the invention may be used to sequester carbon dioxide from flue gas. The invention also relates to a method of recovering carbon dioxide from flue gas by contacting the flue gas with the aqueous absorbent solution described above.

The invention further relates to a method for reducing metal corrosion in an alkanolamine flue gas treating process by adding at least one quaternary ammonium salt of formula (I) to an aqueous alkanolamine solution.

The quantity of the at least one quaternary ammonium salt in the composition varies depending upon the temperatures at which the method of recovering carbon dioxide from flue gas and the method of reducing metal corrosion is operated. For example, if the method is operated at a temperature that does not exceed 60° C., the at least one quaternary ammonium salt of the formula (I) is suitably present in a minimum amount of 0.01% by weight, preferably 0.05% by weight, more preferably 0.10% by weight, and most preferably 0.25% by weight. When the temperature involved in the method does not exceed 60° C., the at least one quaternary ammonium salt of the formula (I) is present in an amount of no more than 1.0% by weight, preferably no more than 0.75% by weight, more preferably no more than 0.6% by weight, and most preferably no more than 0.5% by weight.

When the temperatures involved in the methods described above are greater than 60° C., but less than 95° C., the at least one quaternary ammonium salt of the formula (I) is preferably present in a minimum amount of 0.03% by weight, more preferably 0.05% by weight, and most preferably 0.10% by weight. When the temperatures involved in the methods described above are greater than 60° C., but less than 95° C., the at least one quaternary ammonium salt of the formula (I) is preferably present in a maximum amount of 0.20% by weight, more preferably 0.18% by weight, and most preferably 0.15% by weight.

Herein, a list following the word "comprising" is inclusive or open-ended, i.e., the list may or may not include additional unrecited elements.

The instant invention contemplates embodiments in which each element listed under one group may be combined with each and every element listed under any other group. $R^1$ and $R^2$ are defined above as independently representing optionally aryl-substituted $C_{1-20}$ alkyl groups. $R^3$ and $R^4$ are defined above as independently representing $C_{1-4}$ alkyl groups. Each element of $R^1$ and $R^2$ (an aryl-substituted $C_{1-20}$ alkyl group) can be combined with each and every element of $R^3$ and $R^4$ (a $C_{1-4}$ alkyl group). For example, in one embodiment, $R^1$ is dodecyl, $R^2$ benzyl, $R^3$ is methyl, and $R^4$ is isopropyl. Alternatively, $R^1$ is 3-ethyltridecyl, $R^2$ is octyl, $R^3$ is methyl, and $R^4$ is ethyl.

With each group, it is specifically contemplated that any one of more members can be excluded. For example, if $X^{n-}$ is defined as an anion selected from the group consisting of hydroxide, bicarbonate/carbonate, phosphates, phosphites, hypophosphite, nitrate, sulfates, borates, anions of saturated and unsaturated acyclic $C_{1-20}$ monocarboxylic acids, anions of saturated and unsaturated $C_{2-20}$ dicarboxylic acids, and anions of hydroxy-substituted carboxylic acids, or combinations or mixtures thereof, then it is also contemplated that $X^{n-}$ is defined as hydroxide, bicarbonate/carbonate, phosphates, nitrate, sulfates, borates, and anions of saturated and unsaturated acyclic $C_{1-20}$ monocarboxylic acids.

However, the compounds used in this invention are limited to those that are chemically feasible and stable. Therefore, a combination of substituents or variables in the compounds described above is permissible only if such a combination results in a stable or chemically feasible compound. A stable compound or chemically feasible compound is one in which the chemical structure is not substantially altered when kept at a temperature of 40° C. or less, in the absence of moisture or other chemically reactive conditions, for at least a week.

Carboshield® 1000 is 50% DDABC, 1.2% free amine (didecylmethylamine), 3.3% methanol, 7.2% propylene glycol, and 38.3% water. Carboshield® BTA is mixture of 92.5% Carboshield® 1000 and 7.5% benzotriazole (BTA).

The corrosion rate for the 0.5% Carboshield® 1000 and MEA solutions was significantly lower than the MEA solutions by themselves and with 0.5% Carboshield® BTA. Therefore, adding 0.5% Carboshield® 1000 to a 30% or 70% aqueous MEA solution at 55° C. can significantly reduce the corrosion rate.

Figure 2:
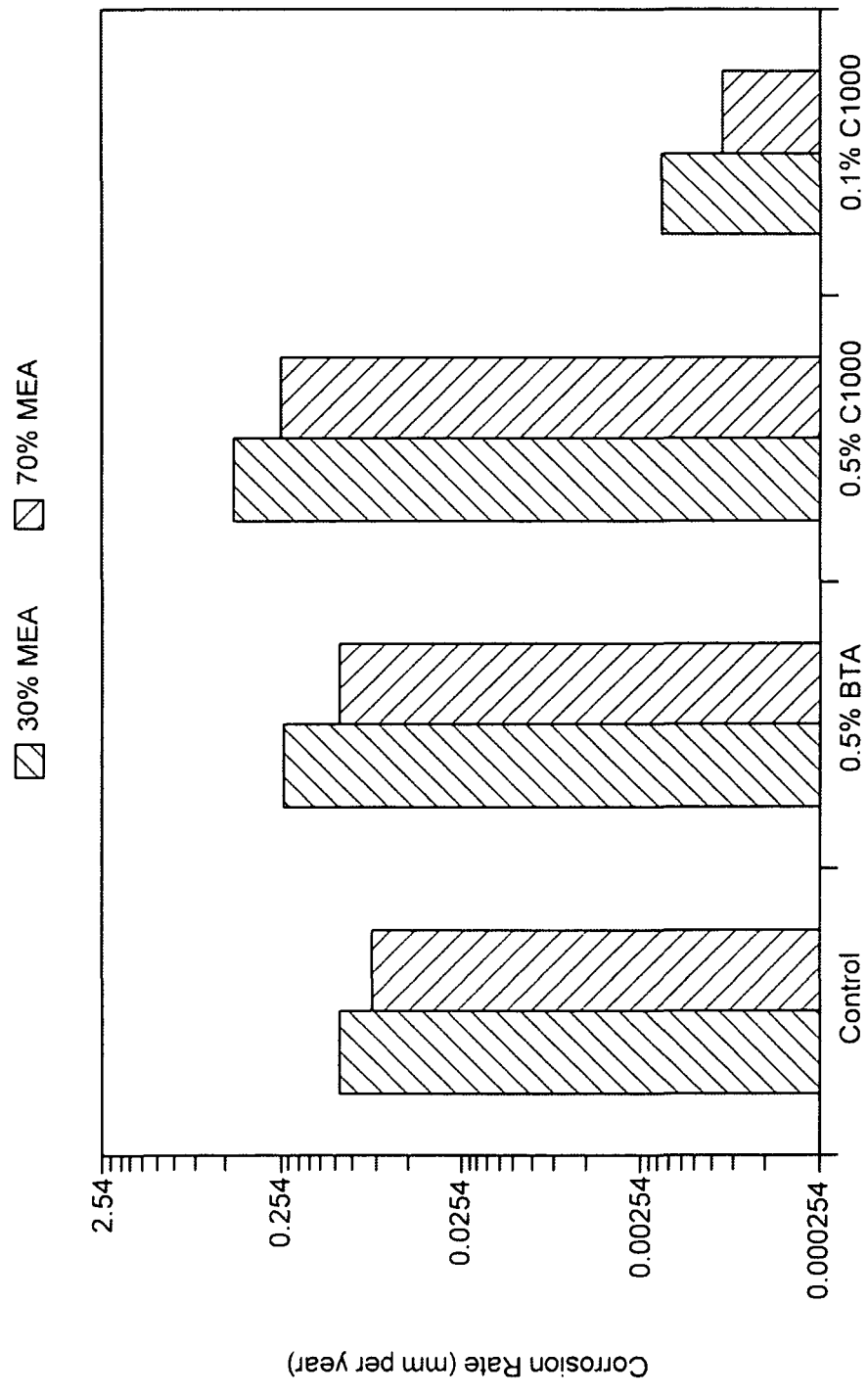

FIG. 2 shows the corrosion rate at 85° C. in mm per year (mm·year$^{-1}$) loss of metal. The corrosion rate was measured for four different groups of samples, each group including one sample containing a 30% aqueous solution of MEA and one sample containing a 70% aqueous solution of MEA. The horizontal axis shows four groups: the control group in which no didecyldimethylammonium salt was added to the MEA solutions, one group in which 0.5% Carboshield® BTA was added to the MEA solutions, one group in which 0.5% Carboshield® 1000 was added to the MEA solutions, and one group in which 0.1% Carboshield® 1000 was added to the MEA solutions.

The corrosion rate for the 0.1% Carboshield® 1000 and MEA solutions was significantly lower than the MEA solutions by themselves and with 0.5% Carboshield® BTA or 0.5% Carboshield® 1000. Therefore, adding 0.1% Carboshield® 1000, i.e., DDABC to a 30% or 70% aqueous MEA solution at 85° C. can significantly reduce the corrosion rate.

EXAMPLES

The present invention may be better understood by reference to the following examples which illustrate the present invention and are not intended to limit the invention or its scope in any manner. All percentages are by weight, unless otherwise specified.

Example 1

A solution was made containing 0.5% Carboshield® 1000 in a 30% aqueous solution of monoethanolamine. Carboshield® 1000 is 50% DDABC, 1.2% free amine (didecylmethylamine), 3.3% methanol, 7.2% propylene glycol, and 38.3% water. Another solution was made containing 0.5% Carboshield® 1000 in a 70% aqueous solution of monoethanolamine. The corrosion rates of these solutions are compared to control solutions of (1) 30% monoethanolamine or (2) 70% monoethanolamine, and solutions of (3) 0.5% Carboshield® BTA in 30% monoethanolamine or (4) 0.5% Carboshield® BTA in 70% monoethanolamine. Carboshield® BTA is a mixture of 92.5% Carboshield® 1000 and 7.5% benzotriazole (BTA).

Cyclic potentiodynamic polarization (CPP) tests were performed with ASTM 1018 carbon steel in monoethanolamine with and without added inhibitors to investigate the corrosion behavior of carbon steel as well as the role of inhibitors. Two different concentrations of monoethanolamine (30% and 70%) and two inhibitors (Carboshield® BTA and Carboshield® 1000) were used.

The CPP tests were performed at 55° C. and 85° C. under constant carbon dioxide sparging. Prior to each test, the monoethanolamine solution was sparged with carbon dioxide for approximately 24 hours, the solution then was heated up to the desired temperature and the desired concentrations of inhibitors were added (no inhibitor was used in the control tests). A platinized niobium wire loop was used as counter electrode and a tungsten/tungsten trioxide wire was used as the reference electrode. The CPP curve was obtained by scanning the potential at a rate of 0.17 mV/s from –0.1V to 1V vs. W/WO$_3$ or until the current reached 1 mA/cm$^2$, whichever occurred first.

Upon completion of the test, the sample was removed from the testing solution and was inspected for the extent of corrosion. To provide a direct comparison of inhibitor performance, the corrosion rate was calculated from the corrosion current extracted from the CPP curves using the equation below:

$$CR = K_l \frac{i_{corr}}{\rho} EW$$

CR=corrosion rate (mm per year)
$K_1$=conversion constant, 0.003272 mm·year$^{-1}$·µA$^{-1}$·g·cm$^{-3}$
$i_{corr}$=observed corrosion current (µA)
$\rho$=density (g/cm$^3$)
EW=equivalent weight of carbon steel, 27

Figure 1:
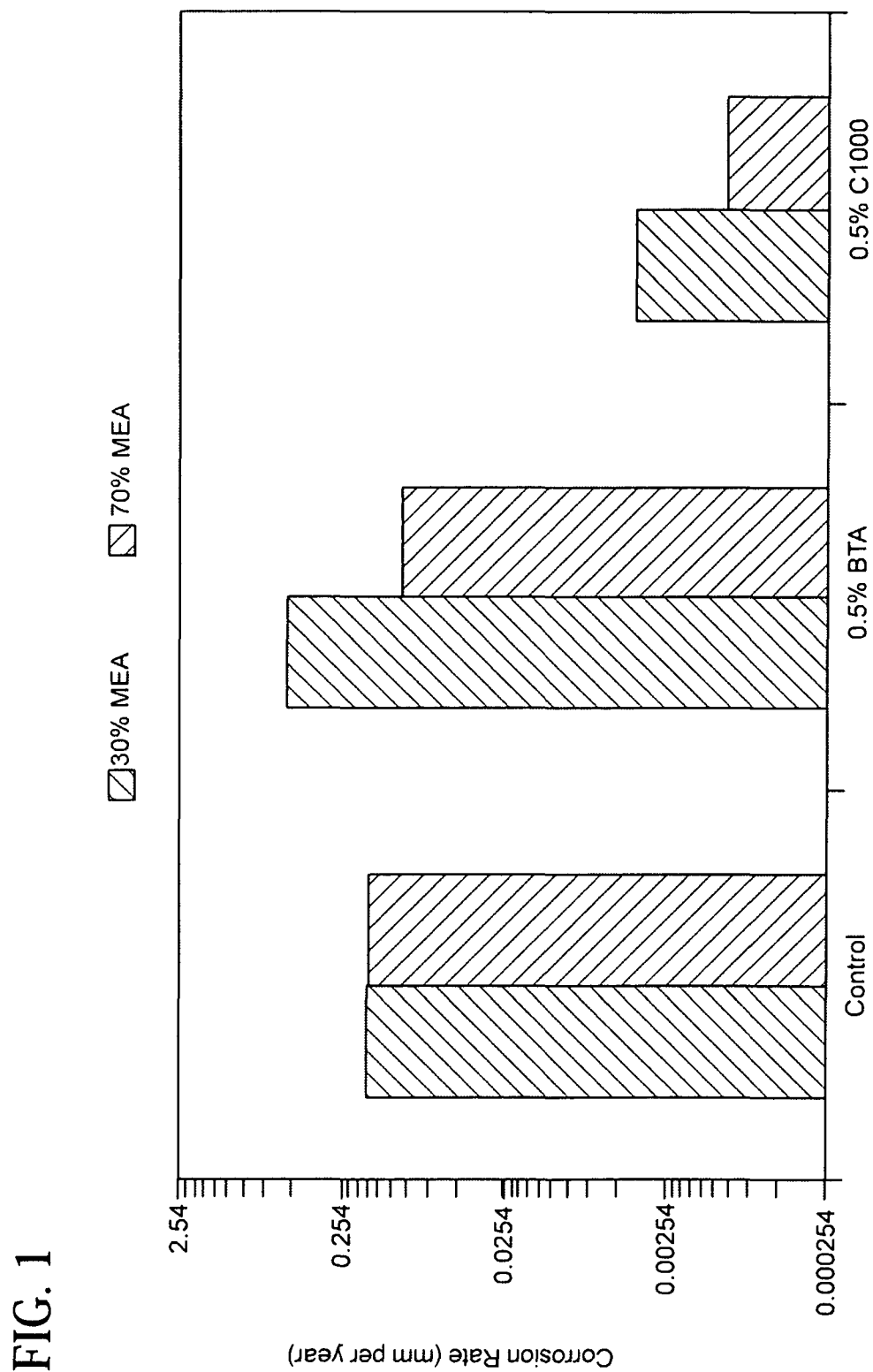
FIG. 1 shows the corrosion rate at 55° C. in mm per year (mm·year$^{-1}$) loss of metal. The corrosion rate was measured for three different groups of samples, each group including one sample containing a 30% aqueous solution of monoethanolamine (MEA) and one sample containing a 70% aqueous solution of MEA. (All percentages are by weight.) The horizontal axis shows three groups: the control group in which no didecyldimethylammonium salt was added to the MEA solutions, one group in which 0.5% Carboshield® BTA was added to the MEA solutions, and one group in which 0.5% Carboshield® 1000 was added to the MEA solutions.

The results of the corrosion rate comparisons are shown in FIGS. 1 and 2.

The invention claimed is:

1. A method of recovering carbon dioxide from a carbon dioxide-containing gaseous mixture, comprising contacting said carbon dioxide-containing gaseous mixture with an aqueous absorbent solution comprising:
   (i) from 10% to 90% by weight, based on the total solution, of monoethanolamine; and
   (ii) from 0.01% to 1.0% by weight, based on the total solution, of at least one quaternary ammonium salt selected from the group consisting of didecyldimethylammonium bicarbonate, didecyldimethylammonium carbonate, and combinations thereof.

2. The method of claim 1, wherein the carbon dioxide-containing gaseous mixture is contacted with the aqueous absorbent solution at a temperature of no more than 60° C.

3. The method of claim 1, wherein the at least one quaternary ammonium salt is present in an amount of 0.03% by weight to 0.20% by weight.

4. The method of claim 2, wherein the carbon dioxide-containing gaseous mixture is contacted with the aqueous absorbent solution at a temperature of between 60° C. and 95° C.

5. The method of claim 1, wherein the monoethanolamine is present in an amount of at least 20% by weight.

6. The method of claim 5, wherein the monoethanolamine is present in an amount of at least 30% by weight.

7. The method of claim 1, wherein the monoethanolamine is present in an amount of no more than 80% by weight.

8. The method of claim 7, wherein the monoethanolamine is present in an amount of no more than 70% by weight.

9. The method of claim 1, wherein the at least one quaternary ammonium salt is present in an amount of at least 0.05% by weight.

10. The method of claim 9, wherein the at least one quaternary ammonium salt is present in an amount of at least 0.10% by weight.

11. The method of claim 10, wherein the at least one quaternary ammonium salt is present in an amount of at least 0.25% by weight.

12. The method of claim 1, wherein the at least one quaternary ammonium salt is present in an amount of no more than 0.75% by weight.

13. The method of claim 12, wherein the at least one quaternary ammonium salt is present in an amount of no more than 0.60% by weight.

14. The method of claim 13, wherein the at least one quaternary ammonium salt is present in an amount of no more than 0.50% by weight.

15. The method of claim 1, wherein the at least one quaternary ammonium salt is present in an amount of no more than 0.18% by weight.

16. The method of claim 15, wherein the at least one quaternary ammonium salt is present in an amount of no more than 0.15% by weight.

* * * * *